United States Patent [19]
Guha

[11] Patent Number: 6,081,805
[45] Date of Patent: *Jun. 27, 2000

[54] PASS-THROUGH ARCHITECTURE VIA HASH TECHNIQUES TO REMOVE DUPLICATE QUERY RESULTS

[75] Inventor: Ramanathan V. Guha, Los Altos, Calif.

[73] Assignee: Netscape Communications Corporation, Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/929,352

[22] Filed: Sep. 10, 1997

[51] Int. Cl.⁷ .................................................. G06F 17/30
[52] U.S. Cl. ............................ 707/5; 707/3; 707/2; 707/4
[58] Field of Search ..................................... 707/5, 4, 3, 2

[56] References Cited

U.S. PATENT DOCUMENTS

| | | | |
|---|---|---|---|
| 4,879,648 | 11/1989 | Cochran et al. | 345/353 |
| 4,961,139 | 10/1990 | Hong et al. | |
| 5,488,725 | 1/1996 | Turtle et al. | 707/5 |
| 5,555,405 | 9/1996 | Griesmer et al. | 395/600 |
| 5,598,559 | 1/1997 | Chaudhuri | 707/2 |
| 5,659,737 | 8/1997 | Matsuda | 707/101 |
| 5,727,196 | 3/1998 | Strauss, Jr. et al. | 707/2 |
| 5,768,532 | 6/1998 | Megerian | 395/200.75 |
| 5,873,080 | 2/1999 | Coden et al. | 707/3 |
| 5,895,465 | 4/1999 | Guha | 707/4 |
| 5,943,665 | 8/1999 | Guha | 707/2 |

OTHER PUBLICATIONS

Knight–Ridder Inforation, "Patent Duplicate Identification on Dialog", pp 001–010, Apr. 30, 1996.

Dialog Chronolog, "Now you can Identify Duplicate records on Dialog", Dec. 1989.

Knight–Ridder Information, "Dialog Pocket Guide", Oct. 1995.

Detwiler, "Setting your sights on target", vol. 22, p. 87–88, Inspec, Jan. 1993.

Celko Joe, "How to deal with duplicate", V8, n4, p20(4), Apr. 1995.

Wilton et al., "Mega–searching from the desktop", v21, n3, p89–91, Jun. 1997.

Udi Manbar, "Finding similar files in a large file system", p 1–10, Oct. 1993.

*Primary Examiner*—Thomas G. Black
*Assistant Examiner*—Jean M. Corrielus
*Attorney, Agent, or Firm*—Michael A. Glenn; Kirk Wong

[57] ABSTRACT

A method and system for removing duplicate query results in a database system comprising a plurality of data sources. The method and system includes issuing a query from a user to a first data source. In response to receiving a first query result from the data source, a first hash index is computed for the first query result and the first query result is passed on to the user. The method and system further includes receiving a second query result and computing a second hash index for the second query result. The first hash index is then compared with the second hash index to cheek for a hash collision. If the first, and second hash indexes match, the first data source is queried for data corresponding to the second query result. And if the first data source contains the data, then the second query result is considered a duplicate and is discarded.

18 Claims, 4 Drawing Sheets

PASS-THROUGH ARCHITECTURE VIA HASH TECHNIQUES TO REMOVE DUPLICATE QUERY RESULTS

CROSS-REFERENCE TO RELATED APPLICATIONS

The present application is related to application Ser. No. 08/925,786, entitled "A Method And System For Performing Conceptual Joins Across Fields Of A Database" (NETS0028) and application Ser. No. 08/925,632, entitled "Heuristic Co-Identification of Objects Across Heterogeneous Information Sources" (NETS0030) filed on the same date as the present application and assigned to the assignee of the present application.

FIELD OF THE INVENTION

The present invention relates to database systems, and more particularly to a method and system for providing a pass through architecture via hash techniques to remove duplicate query results.

BACKGROUND OF THE INVENTION

A database system may be described as a computerized record keeping system whose overall purpose is to maintain information and to make that information available on demand. Many databases in use today are based on a "relational model" in which the database data is perceived by its users as a collection of tables. The tables in a relational database include a row of column names specifying one or more column fields, and zero or more data rows containing one scalar value for each of the column fields. Each column in a database stores data regarding a particular concept or object using a particular data type, such as character strings, numeric data, and dates.

One feature that distinguishes relational from nonrelational databases is the ability to "join" two or more tables. In general, a join is described as a query in which data is retrieved from the fields of more than one table (although data may also be retrieved by joining a table with itself). Typically, the tables within the same database are joined. However, with current database technology, the tables to be joined need not be physically present in the same database.

Products such as SQLConnect™ from Oracle and SQL-Net™ from Microsoft, enable the use of a heterogeneous database where a collection of database tables on different hardware platforms operating under different database management systems all appear to a user to be on one machine operating under one database management system. And in the Internet environment, some Internet search services enable users to search for information from data sources that are both implemented on different platforms as well as distributed throughout the world.

In these type of database environments, a user's query may produce an extremely high number of "hits", which are passed back to the user in the form of query results. Although the results returned from one particular data source may not contain duplicates, there are often many duplicates in the overall set of returned results. Current methods for removing duplicates involve storing the total number of results returned-from the data sources, and then searching through the list to remove duplicates. Storing the total number of returned results increases the memory requirements of the database system and may result in a decrease in the speed at which the results are provided to the user.

Accordingly, what is needed is an improved method and system for removing duplicate query results in a database system. The present invention addresses such a need.

SUMMARY OF THE INVENTION

The present invention provides a method and system for providing a pass through architecture for database systems comprising a plurality of data sources that removes duplicate query results via hash techniques. The method and system— includes issuing a query from a user to a first data source. In response to receiving a first query result from the data source, a first hash index is computed for the first query result and the first query result is passed on to the user. In response to receiving a second query result, a second hash index is computed. The first hash index is then compared with the second hash index to check for a hash collision. If the first and second hash indexes match, the first data source is queried for data corresponding to the second query result. And if the first data source contains the data, then the second query result is considered a duplicate and is discarded.

According to the system and method disclosed herein, the memory requirement of the database system is reduced since there is no longer a need to store the total number of results returned from the user query.

DESCRIPTION OF THE INVENTION

The present invention relates to an improvement in providing query results. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
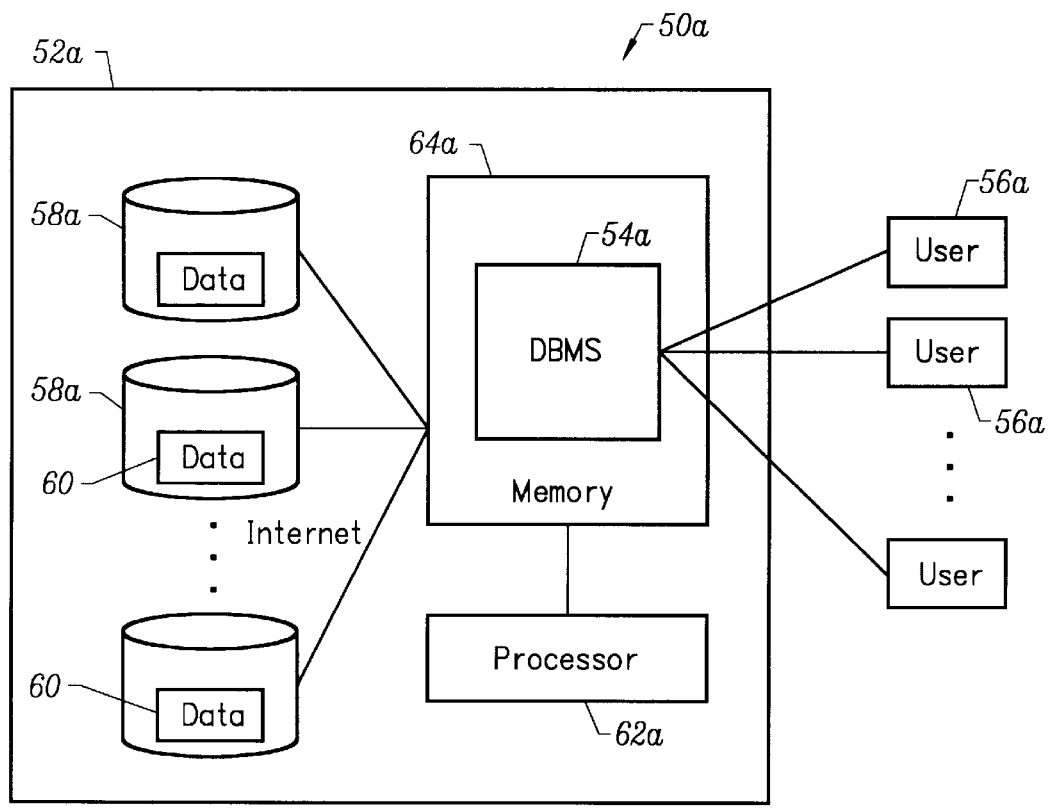
FIG. 1A is a block diagram illustrating a conventional relational database system.
Figure 1B:
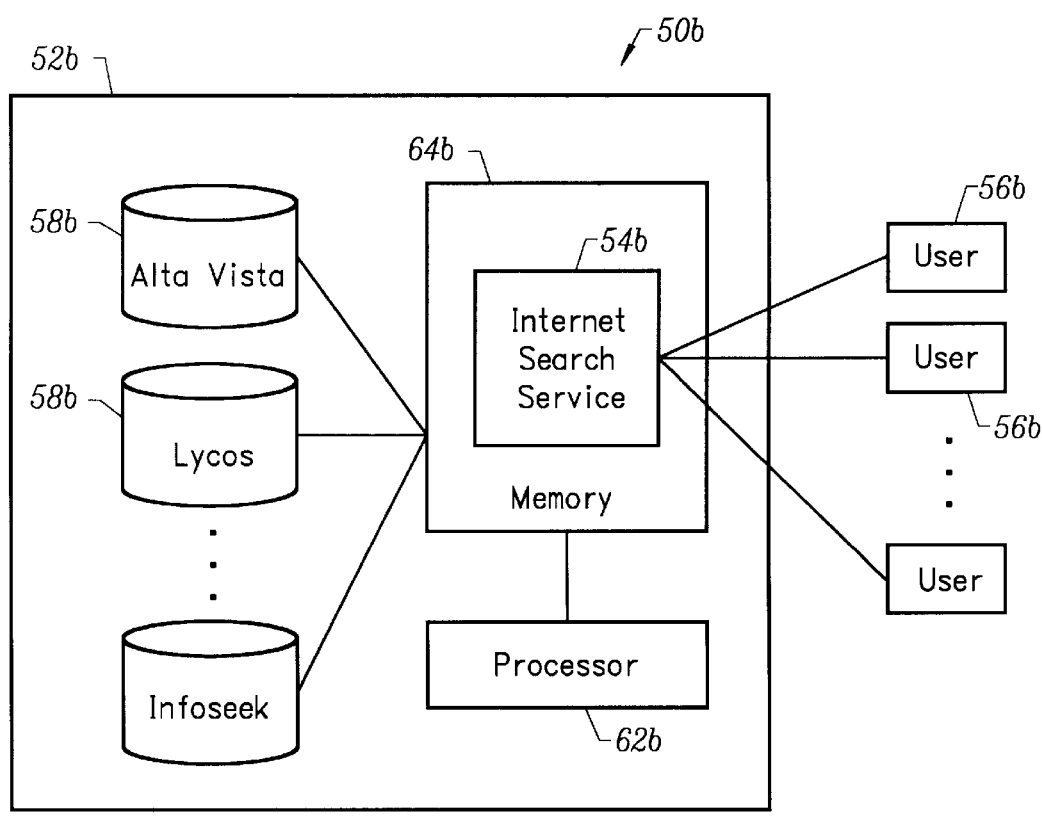
FIG. 1B is a block diagram illustrating a conventional internet-based database system.

FIGS. 1A and 1B are block diagrams illustrating two types of database systems. FIG. 1A illustrates a conventional relational database system 50a, and FIG. 1B is a block diagram illustrating a conventional internet-based database system 50b. Referring now to FIG. 1A, the database system 50a includes database hardware 52a, application software 54a, and users 56a of the database. The database hardware 52a includes storage devices, typically hard disk drives 58a, for storing database data 60, together with associated input/output-devices, such as device controllers (not shown). A processor 62a and associated main memory 64a are used to support the execution of the application software 54a.

The users 56a of the database 50a may be categorized in three broad classes: application programmers who are responsible for writing application programs that use the database 50a, end-users who interact with the database 50a from on-line terminals, and database administrators (DBAs) who create and maintain the database 50a and who-provide multiple end-users with security access to the database 50a. If the database 50a is designed for a single-user, as opposed to multi-user database, then the end-user also performs the function of the DBA.

The database data 60 may be located in a central location and/or located remotely via a network. The database 50a is based on the relational model in which the data 60 is organized as a collection of tables. The application software 54a in a relational database, which is the interface between the users 56a of the system and the physical database itself (i.e., the data 60 and the disk drives 58a), is referred to as the database management system (DBMS).

All request from users for access to the database data 60 are handled by the DBMS 54a. The DBMS 54a thus shields the users 56a from hardware-level details of the database 50a by supporting database operations, such as adding files to the database, inserting data into existing files, updating files, deleting files, and retrieving data from existing files.

The DBMS 54a includes a built-in application, typically referred to as a query language processor, by which a user 56a is able to issue high-level commands or statements to the DBMS 54a. Such commands include SELECT, INSERT, UPDATE and DELETE, which are examples of statements from the standard database language known as SQL (Structured Query Language). The SQL commands and queries are typically entered into the DBMS 54a through either a command-driven interface or through a menu-driven interface in which the user 56a is not required to enter commands, but instead fills in items on a form and chooses items from menus. Once the user's query is received by the DBMS 54a, the DBMS 54a may generates one or more back-end queries. Each back-end query specifies a particular data source, e.g., database tables, in which to search for the requested information. Each data source then returns the results of the query back to the DBMS 54a, which then presents the results to the user 56a.

Referring now to FIG. 1B, the internet-based database system, 50b is similar to the relational database system 50a in that it includes database hardware 52b, application— software 54b, and users 56b of the database. Rather than a DBMS, however, the application software 54b comprises an Internet search service 54b, such as Meta Crawler, and the data sources 58b are Internet search engines, such as Alta Vista, Lycos, and Infoseek, for instance.

In operation, the user 56b typically enters the Internet home page of the search engine 54b using an Internet browser (not shown), and then enters keywords that are used to guide the search. After receiving the key words, the search service 54b simultaneously transmits multiple back-end queries that include the both the keywords and the identity of the data source 58b (e.g, a search engine) in which to carry out the search. In response to receiving one of the queries, the Internet search engine 52b specified in the back-end query searches categorized Internet sites and generates respective lists of those sites that contain the keywords from the query. The search service 54b collects these results, and displays the results to the user 56b on a page-by-page basis.

In both database systems 50a and 50b, the results for the query originate from several different data sources. Although the results returned from one particular data source may not contain duplicates, there are often many duplicates in the overall set of returned results. The total number of the results returned may be extremely large, such as thousand or millions, which translates into megabytes and gigabytes of data. In an effort to reduce the number of results displayed to the user 56, the application software 54 attempts to remove duplicates before passing the results of the query to the user 56.

Most conventional methods for removing duplicates results involve storing all of the results from each data source in a large list, and- then searching the list to ensure that each result does not occur elsewhere in the list. Although this method-effectively removes duplicates, the method requires an enormous amount of memory to store all of the returned results. In addition, the method is slow due to the fact that the entire list must be traversed for each result examined.

Another method for removing duplicates involves running through the list of results once and providing each item in the list with a tag to increase the speed of the search. This method, however, still requires a large amount of memory because all of the results returned from the query must still be stored in a list, even if only temporarily.

The present invention is a method and system for providing a database pass-through architecture for removing duplicate query results via hash techniques. According to the method and system of the present invention, duplicate query results are removed without the need to store every returned result in memory.

Figure 2:
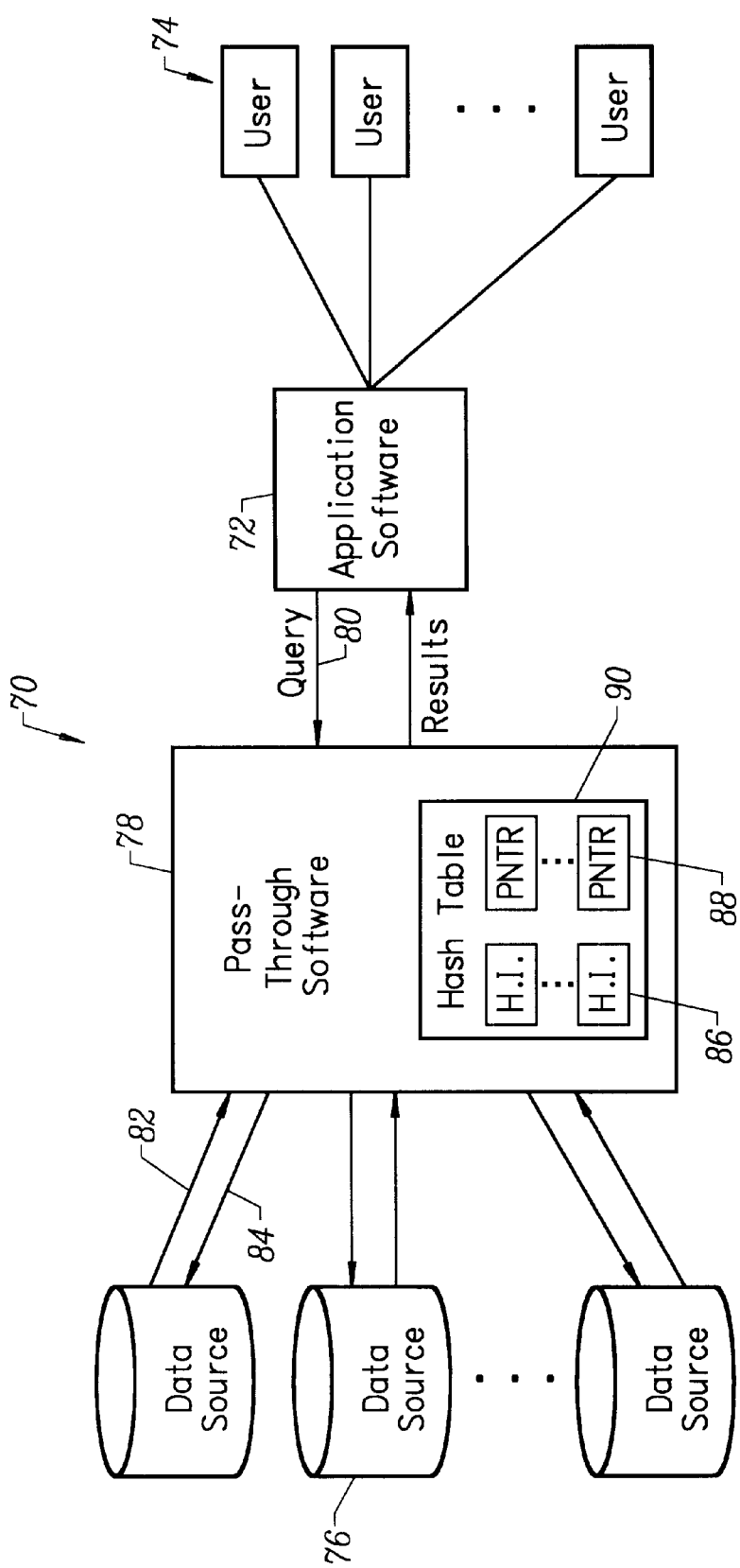
FIG. 2 is block diagram illustrating a database pass-through architecture in accordance with the present invention.

FIG. 2 is block diagram illustrating a database pass-through architecture in accordance with the-present invention. The database pass-through architecture 70 includes application software 72 for receiving queries from a user 74, and a number of information sources 76 for providing information in response to the queries. As described above, the application software 72 may include a DBMS or an Internet search service, and the data sources may include database tables or Internet search engines, for example.

In accordance with the present invention, the database pass through architecture 70 includes pass-through software 78 that acts as an interface between the application software 72 and the information sources 76. The pass-through software 78 first passes user queries 80 from the application software 72 to the data sources 76. The pass-through software 78 then receives the results of the query and removes duplicates using a hashing technique that eliminates the need to store all the returned results, as described with reference to FIG. 3.

Figure 3:
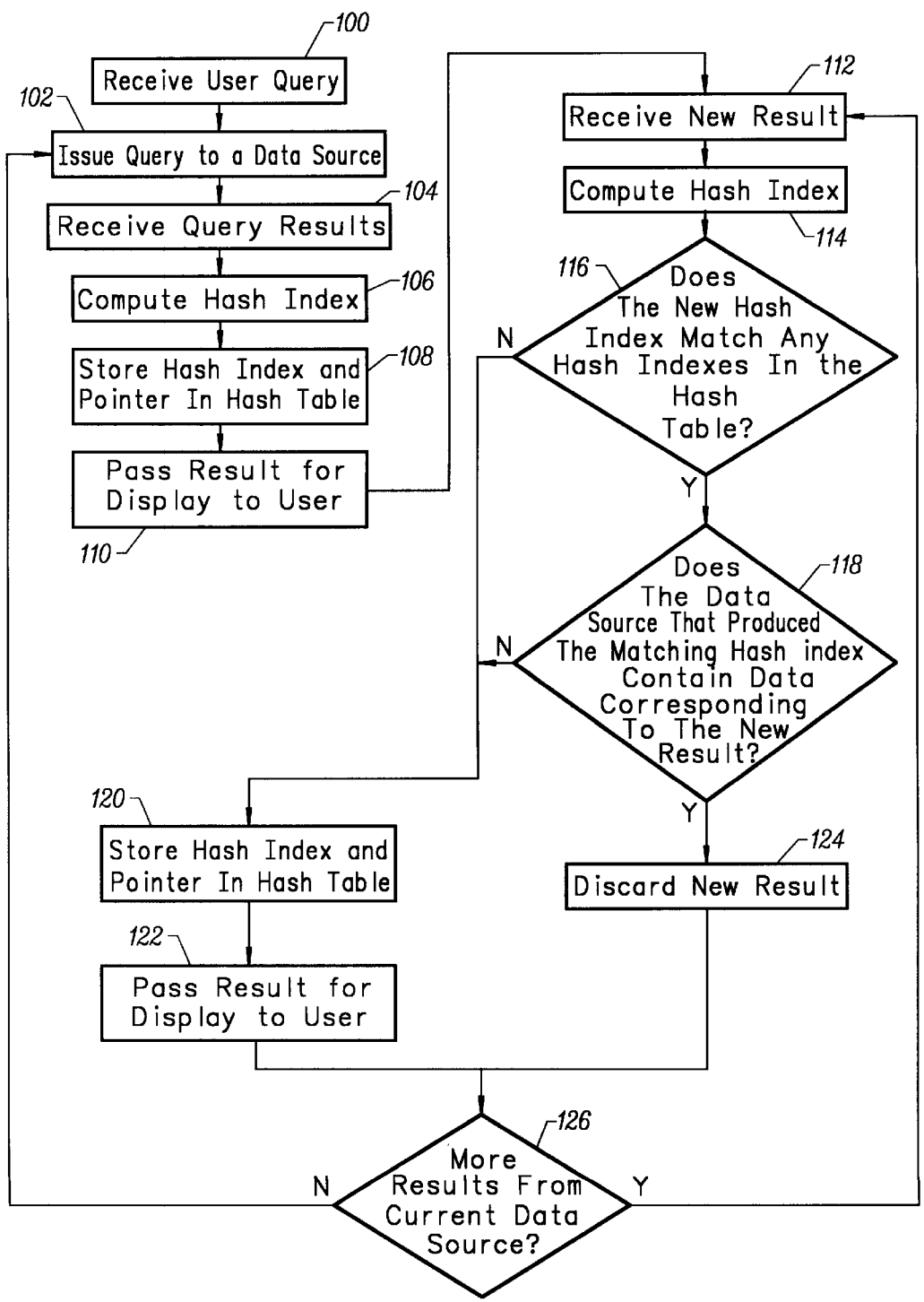
FIG. 3 is a flow chart illustrating the duplicate removal process performed by the pass-through software in accordance with the present invention.

FIG. 3 is a flow chart illustrating the duplicate removal process performed by the pass-through software 78 in accordance with the present invention. Referring to both FIGS. 2 and 3, the process begins when the pass-through software 78 receives a user query 80 from the application software 72 in step 100. In response to receiving the query 80, the pass-through software 78 issues multiple queries 82 to the data sources 76 in step 102. Each of the multiple queries includes the query terms from the user and identifies a particular data source 76 to carry out the query. According to the present invention, the multiple queries 82 are issued to one data source 76 at a time, rather than to all of the relevant data sources 76 at once, as in prior techniques. Issuing the query 82 to only one data source 76 at a time allows the results from that data source 76 to be processed before the results from the next data source 76 are received.

After issuing a query 82, the pass-through software 78 receives a set of results 84 from the data source 76 in step 104. After receiving a result 84, the pass-through software 78 computes a hash index 86 for the result 84 in step 106. After the hash index 86 is computed, the hash index 86 and a pointer to the data source 76 that produced the result 84 are stored in a hash table 90 in step 108. The result is then passed to the application software 72 for display to the user 74 in step 110.

In a preferred embodiment of the present invention, the hash indexes in the hash table 90 are four-bytes id length and are computed using the Knuth Hashing Algorithm. However, as recognized by those with ordinary skill in the art, the hash index may be any number of bytes length and may be computed using any type of highly discriminating hash algorithm or combination of hash algorithms. Longer hash indexes reduce has collisions, but require more memory to store.

After processing the result, the pass-through software 78 receives a new result 84 in step 112. A hash index 86 is computed for the new result, as described above, in step 114. According to the present invention, duplicate results are checked for by determining whether a possible hash collision exist. This is accomplished by checking if the hash index of the new result matches any of the hash indexes in the hash table 90 in step 116. Given two results that have matching hash indexes 86, two outcomes are possible. One outcome is that the new result is a duplicate. The other outcome is that the results represent different answers even though the hash indexes are the same.

Therefore, when a possible hash collision exists, the pass-through software 78 determines whether a true hash collision exist by requesting the data source that produced the matching hash index to confirm whether it contains data corresponding to new result in step 118. This is done by issuing a query containing the new result and the pointer corresponding to the matching hash index from the-hash table.

If either the hash index does not match any of the hash indexes in the hash table 90, or if the data source does not contain information corresponding to the new result, then a true hash collision does not exist and the result has not been previously passed to the user 74. In this case, the hash.index computed for the new result and a pointer to the data-source 76 that produced the new result are stored in the hash table 90 in step 120 and the new result is passed to the application software 72 for display to the user 74 in step 122.

If the data source indicates that it contains information corresponding to the new result, in step 118, then it is known that the result has been previously passed to the user so there is no need to pass-on a new copy. In this case the new result and its hash index are discarded in step 124.

If there are no more results to process from the data source 76 just queried in step 126, then the pass-through software 78 issues the query 82 to the next data source in step 102. Otherwise, another new result is received in step 112 and the process continues.

To further explain the pass-through process via hash techniques of the present invention, consider the following example. A user wants a listing of all the doctors in the city of Seattle and the results are to include each person's first and last name, address, and social security. Assume that one available data source is a database for the Department of Motor Vehicles (DMV), which includes information about licensed drivers, such as the driver's profession. Assume further that the another available data source is a Visa-credit card database that also includes the profession of the card holders. Although not all doctors have cars registered in their names, and not all doctors have a Visa credit card, there is an intersection of doctors in the two databases.

In operation, the pass-through software 78 will send the user's query to the first data source. Since no duplicate results will be returned from the DMV database, each result returned is passed-on to the user, and a hash index is computed for each result returned. The hash indexes and a pointer to the DMV database are also stored in a hash table. Assume that one result returned from the DMV database includes the data "Fred Jones, X-address, X-SSN", and that the hash index computed for this result is "999".

After all the results from the DMV database are received and processed, the pass-through software 78 sends the user's query to the second data source, the VISA database. Since the results from the Visa database may produce some of the same results as the DMV database, the pass-through software 78 computes a hash index for each result received and compares it to the hash indexes in the hash table to check for hash collisions.

Assume that one result returned from the Visa database includes the data "Ray Stone, Y-address, Y-SSN", but that the hash index is also "999". Since the hash index "999" matches one of the hash indexes in the hash table, a possible hash condition exists. In response, the pass-through software 78 checks the pointer corresponding to the matching hash index in the table and determines that the result corresponding to the matching hash index originated from the DMV database. The pass-through software 78 queries the DMV database to determine it contains the data "Ray Stone, Y-address, Y-SSN". If the answer is no, then the pass-through software 78 is informed that the result from the Visa database is not a duplicate, and the answer is passed-on to the user. If the answer is yes, then the pass-through software 78 is informed that the result from the Visa database is a duplicate, and the result is discarded.

A pass-through database architecture for removing duplicate query results via hash techniques has been disclosed. Software written according to the present invention is to be stored in some form of computer-readable medium, such as memory or CD-ROM, or transmitted over a network, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-readable medium containing program instructions for removing duplicate query results in a system comprising a plurality of data sources, the program instructions for:

a) issuing a query from a user to a first data source;

b) receiving a first query result;

c) computing a first index for the first query result;

d) passing the first query result to the user;

e) issuing said query to a second data source:

f) receiving a second query result;

g) computing a second index for the second query result;

h) comparing the first index with the second index to check for an index collision;

i) if the first and second indexes match, querying the first data source for data corresponding to the second query result;

j) discarding the second query result if the first data source contains the data; and wherein queries are issued to one data source at a time, allowing the results from each data source to be processed before the results from the next data source are received.

2. The computer-readable medium of claim 1 wherein instruction c) further includes an instruction for:

c1) storing the first index and a pointer to the first data source that produced the first query result in a hash table.

3. The computer-readable medium of claim 1 further including an instruction for: p1 k) if the first and second indexes do not match, passing the second query result to the user.

4. The computer-readable medium of claim 1 wherein program instruction k) further induces an instruction for:

k1) storing the second index and a pointer to the data source that produced the second query result in a hash table if the first and second indexes do not match.

5. The computer-readable medium of claim 1 wherein each index is a hash index that Is computed using a highly discriminating hash algorithm.

6. The computer-readable medium of claim 5 wherein the hash algorithm is a Knuth Hashing Algorithm.

7. A process for removing duplicate query results in a system comprising a plurality of data sources in a computer environment, comprising the steps of:

issuing a query from a user to a first data source;

receiving a first query result;

computing a first index for the first query result;

passing said first query result to the user;

sending said query to a second data source;

receiving a second query result;

computing a second index for said second query result;

comparing said first index with said second index to check for an index collision;

wherein if said first and second indexes match, then said first data source is queried for data corresponding to said second query result;

discarding said second query result if said first data source contains said data; and wherein queries are issued to one data source at a time, allowing the results from each data source to be processed before the results from the next data source are received.

8. The process of claim 7, further comprising the step of:

storing said first index and a pointer to said first data source in a hash table.

9. The process of claim 7, further comprising the step of:

passing said second query result to said user if said first and second indexes do not match.

10. The process of claim 7, further comprising the step of:

storing said second index and a pointer to said second data source in a hash table if said first and second indexes do not match.

11. The process of claim 7, wherein each index is a hash index that is computed using a highly discriminating hash algorithm.

12. The process of claim 11, wherein said hash algorithm is a Knuth Hashing Algorithm.

13. An apparatus for removing duplicate query results in a system comprising a plurality of data sources in a computer environment, comprising:

a module for issuing a query from a user to a first data source;

a module for receiving a first query result;

a module for computing a first index for the first query result;

a module for passing said first query result to the user;

a module for sending said query to a second data source;

a module for receiving a second query result;

a module for computing a second index for said second query result;

a module for comparing said first index with said second index to check for an index collision;

wherein if said first and second indexes match, then said first data source is queried for data corresponding to said second query result;

a module for discarding said second query result if said first data source contains said data; and wherein queries are issued to one data source at a time, allowing the results from each data source to be processed before the results from the next data source are received.

14. The apparatus of claim 13, further comprising:

a module for storing said first index and a pointer to said first data source in a hash table.

15. The apparatus of claim 13, further comprising:

a module for passing said second query result to said user if said first and second indexes do not match.

16. The apparatus of claim 13, further comprising:

a module for storing said second index and a pointer to said second data source in a hash table if said first and second indexes do not match.

17. The apparatus of claim 13, wherein each index is a hash index that is computed using a highly discriminating hash algorithm.

18. The apparatus of claim 17, wherein said hash algorithm is a Knuth Hashing Algorithm.

* * * * *